the term of this
United States Patent
Preaux

(10) Patent No.: US 8,095,251 B2
(45) Date of Patent: Jan. 10, 2012

(54) SYSTEM FOR MONITORING ANEMOBAROCLINOMETRIC PARAMETERS FOR AIRCRAFT

(75) Inventor: Guillaume Preaux, Toulouse (FR)

(73) Assignee: Airbus France, Toulouse (FR)

( * ) Notice: Subject to any disclaimer, the term of this patent is extended or adjusted under 35 U.S.C. 154(b) by 718 days.

(21) Appl. No.: 12/067,730

(22) PCT Filed: Sep. 21, 2006

(86) PCT No.: PCT/FR2006/050926
§ 371 (c)(1),
(2), (4) Date: Jul. 31, 2008

(87) PCT Pub. No.: WO2007/036662
PCT Pub. Date: Apr. 5, 2007

(65) Prior Publication Data
US 2009/0222150 A1    Sep. 3, 2009

(30) Foreign Application Priority Data
Sep. 27, 2005    (FR) ..................... 05 52895

(51) Int. Cl.
*G01P 5/26* (2006.01)
*G01S 17/58* (2006.01)
(52) U.S. Cl. ................. 701/7; 701/3; 702/144
(58) Field of Classification Search ............. None
See application file for complete search history.

(56) References Cited

U.S. PATENT DOCUMENTS

| | | | |
|---|---|---|---|
| 4,483,614 A | | 11/1984 | Rogers |
| 5,000,566 A | * | 3/1991 | Kuppenheimer et al. ....... 356/28 |
| 5,001,638 A | * | 3/1991 | Zimmerman et al. .......... 701/14 |
| 5,648,604 A | * | 7/1997 | Morbieu .................. 73/181 |
| 6,668,640 B1 | * | 12/2003 | Alwin et al. .............. 73/170.02 |
| 6,894,768 B2 | * | 5/2005 | Caldwell et al. ............. 356/28 |
| 2005/0010389 A1 | * | 1/2005 | D'Ouince et al. ............. 703/22 |
| 2005/0279888 A1 | * | 12/2005 | Mirand et al. ............. 244/129.1 |

FOREIGN PATENT DOCUMENTS
EP    0374822 A1    6/1990

OTHER PUBLICATIONS

A laser anemometer reference for AIR data calibration; Mandle, J.; Aerospace and Electronics Conf., 1988, NAECON; IEEE; May 1988; p. 300-308.*

Pogosov G A et al: "Use of On-Board Laser Doppler Systems to Measure the Wind-Speed Parameters of Aircraft Flight", Measurement Techniques, Consultants Bureau. New York, US, vol. 37, No. 9, Sep. 1994, pp. 1036-1041, XP000524482 ISSN: 0543-1972.

* cited by examiner

*Primary Examiner* — Michael J. Zanelli
(74) *Attorney, Agent, or Firm* — Perman & Green, LLP

(57) ABSTRACT

The disclosed embodiments concerns a system for monitoring anemobaroclinometric parameters in an aircraft, including a primary detection circuit having at least one measurement channel. The measurement channel includes

- a device for measuring static air pressure,
- a device for measuring a side-slip angle of the aircraft,
- a device for measuring a dynamic pressure, a total air temperature and a angle of attack of the aircraft, and
- a data-processing device capable of determining anemobaroclinometric parameters from the measurements of static pressure, side-slip angle, dynamic pressure, total air temperature and angle of attack,
- a least one laser anemometer to measure at least one true airspeed parameter of the aircraft.

6 Claims, 4 Drawing Sheets

SYSTEM FOR MONITORING ANEMOBAROCLINOMETRIC PARAMETERS FOR AIRCRAFT

CROSS-REFERENCE TO RELATED APPLICATIONS

This application is the National Stage of International Application No. PCT/FR2006/050926, International Filing Date, Sep. 9, 2006, which designated the United States of America, and which international application was published under PCT Article 21(2) as WO Publication No. WO 2007/036662 A1 and which claims priority from, and the benefit of, French Application No. 0552895, filed Sep. 27, 2005, the disclosures of each being incorporated by reference in their entirety

BACKGROUND

1. Field

The disclosed embodiments relate to a system for monitoring anemobaroclinometric parameters in an aircraft. This system can be used to obtain knowledge, on board the aircraft, of the value of the anemobaroclinometric parameters relative to the flight of the aircraft. Anemobaroclinometric parameters are the parameters related to the position and speed of the aircraft in flight relative to the surrounding air.

The disclosed embodiments can be applied in aeronautics and especially in the measurement of parameters pertaining to this anemoclinometry of the aircraft.

2. Brief Description

It is important, on board an aircraft, to have certain items of information on the flight of the aircraft. Anemometric measurements techniques are used to obtain this knowledge, relating especially to the airspeed of the aircraft, its position in space relative to the air, its altitude as well as direct air parameters. These items of information are called anemobaroclinometric parameters. These anemobaroclinometric parameters include parameters relative to the air surrounding the aircraft, such as the static pressure, the dynamic pressure or again the total air temperature. There are also parameters relative to the position of the aircraft in this environment such as the speed of the aircraft, its angle of attack or again in its side-slip angle. The angle of attack is the relative angle between the direction of airflow and the horizontal path of the aircraft. The side-slip angle of the aircraft is the angle of airflow relative to the path of the aircraft.

From the value of certain of these parameters, it is possible to determine the values of some other of these parameters. Thus, to know the value of all the anemobaroclinometric parameters that are useful on board the aircraft, certain of these anemobaroclinometric parameters are measured and the other parameters are deduced therefrom.

At present, the parameters are measured on board the aircraft by means of different probes placed outside the aircraft, on the external skin of the aircraft.

A classic system for the detection of anemobaroclinometric parameters in an aircraft is shown in FIG. 1. The system comprises a primary detection circuit and a secondary detection circuit, also called a standby circuit, used in the event of non-operation of the primary circuit or measurement problems detected on the primary circuit 1.

The primary circuit 1 comprises several measurement channels. Generally, the primary circuit comprises three substantially identical measurement channels 10, 20, 30. These three measurement channels 10, 20 and 30 all carry out a measurement of the same parameters. The existence of several measurement channels in a same circuit is aimed at providing for redundancy of the measurements for reasons of flight safety of the aircraft. It is thus ensured that the measurement obtained is accurate.

Classically, each measurement channel 10, 20 or 30 of the primary circuit 1 comprises:

one or more probes for the detection of the static pressure 13-14, 23-24 or 33-34, a probe for the detection of the dynamic pressure, or total pressure, a probe for the measurement of the total air temperature, and a probe to measure the angle of attack of the aircraft.

In certain aircraft, several probes are assembled in one and the same probe which provides several values of parameters. In the case of FIG. 1, a multifunction probe MFP 15, 25, 35 measures the dynamic pressure, the total air temperature and the angle of attack.

On board certain aircraft, as in the example of FIG. 1, an SSA (side-slip angle) probe 11, 21, 31 is used to measure the side-slip angle of the aircraft.

For each measurement channel, the pieces of information measured by the different probes are transmitted to a data-processing device ADIRU 12, 22, 32. This data-processing device 12, 22, 32 processes the measurements made by the probes and determines the values of the other non-measured parameters. It carries out for example the determining of the computed airspeed, the true airspeed of the aircraft and the Mach number of the aircraft.

As explained here above, the classic monitoring systems comprise a first security level obtained by the redundancy of the measurements in the primary circuit 1. Generally, the classic monitoring systems comprise a second security level obtained by the secondary circuit 2. Classically, this secondary circuit 2 comprises one or more static pressure probes 43, 44 and one Pitot tube 40 which detects the dynamic pressure of the air. This secondary circuit 2 comprises one or more data-processing devices 41, 42 which process the values measured in order to deduce the non-measured anemobaroclinometric parameters therefrom.

Thus, in the event of failure of the primary circuit 1, the minimum information needed for the security of the flight of the aircraft is given by the secondary circuit 2.

As explained here above, the flight safety is provided, in classic systems for the monitoring of anemobaroclinometric parameters by the redundancy of the measurement channels in the primary circuit and by the existence of the secondary circuit. In other words, security is obtained by means of detection circuits that combine mechanics and electronics. These primary and secondary detection circuits are therefore circuits of a same mechanical and electronic type. Consequently, if a phenomenon is liable to prompt dysfunction in an element of the system, for example a static pressure probe, then all the similar elements of the system, i.e. all the static pressure probes, are also affected. There is then no way, anywhere in the system, of knowing the static pressure of the air.

Furthermore, the different probes used in classic systems are installed on the external skin of the aircraft, protruding out of said skin. In particular, the Pitot tube is a tube that extends beyond the aircraft and is placed in the direction of the forward progress of the aircraft. The static pressure probe requires an aperture in the wall of the fuselage, perpendicular to the direction of forward progress of the aircraft. The probes used to measure angle of attack and side-slip angle each have a mobile fin, mounted on a rotational axis, sensitive to the variation in airflow relative to the aircraft. These probes therefore constitute protuberant features on the external skin of the aircraft. They thus provide drag to the aircraft. Furthermore, they can generate noise.

Furthermore, these probes are sensitive to frost and rain. In order that frost may be prevented from getting deposited on it, a probe must be equipped with heating means: this increases the volume of the probe and hence the size of the protuberance on the external skin of the aircraft.

SUMMARY

The disclosed embodiments are aimed precisely at overcoming the drawbacks of the techniques explained here above. To this end, the disclosed embodiments propose a system for monitoring anemobaroclinometric parameters in which the redundancy or doubling of measurements is obtained by a technique other than that of mechanics. The disclosed embodiments therefore propose to add an optical type of measuring circuit or at least partially to replace a detection circuit or a classic measurement channel by an optical type of measuring circuit such as this. This optical measuring circuit has a laser anemometer.

According to the disclosed embodiments a laser anemometer can be added to the primary and secondary circuits to add an additional element of security with additional measurements of parameters. It can also totally or partially replace the classic secondary circuit or a measurement channel of the primary circuit to provide an element of additional security with the use of a novel measurement technique.

More specifically, the disclosed embodiments relate to a system for monitoring anemobaroclinometric parameters in an aircraft, comprising a primary detection circuit comprising at least one measurement channel, this measurement channel comprising:

a device for the measurement of the static pressure around the aircraft;

a device for measuring a side-slip angle of the aircraft, a device for measuring a dynamic pressure, a total air temperature and a angle of attack of the aircraft, and a data-processing device capable of determining anemobaroclinometric parameters from the measurements of static pressure, side-slip angle, dynamic pressure, total air temperature and angle of attack, characterized in that said device comprises a least one laser anemometer to measure at least one true airspeed parameter of the aircraft.

The disclosed embodiments may comprise one or more of the following characteristics:

the laser anemometer is integrated into a secondary detection circuit.

the system comprises a secondary detection circuit comprising at least one static pressure measurement device, at least one dynamic pressure measurement device and at least one device for processing the data supplied by the measurement devices, the laser anemometer constituting a circuit for monitoring the parameters.

the anemometer is integrated into a second measurement channel of the primary detection circuit.

the primary circuit comprises a third measurement channel similar to the first measurement channel.

the primary circuit has a third measurement channel integrating a second anemometer.

DETAILED DESCRIPTION

Figure 1:
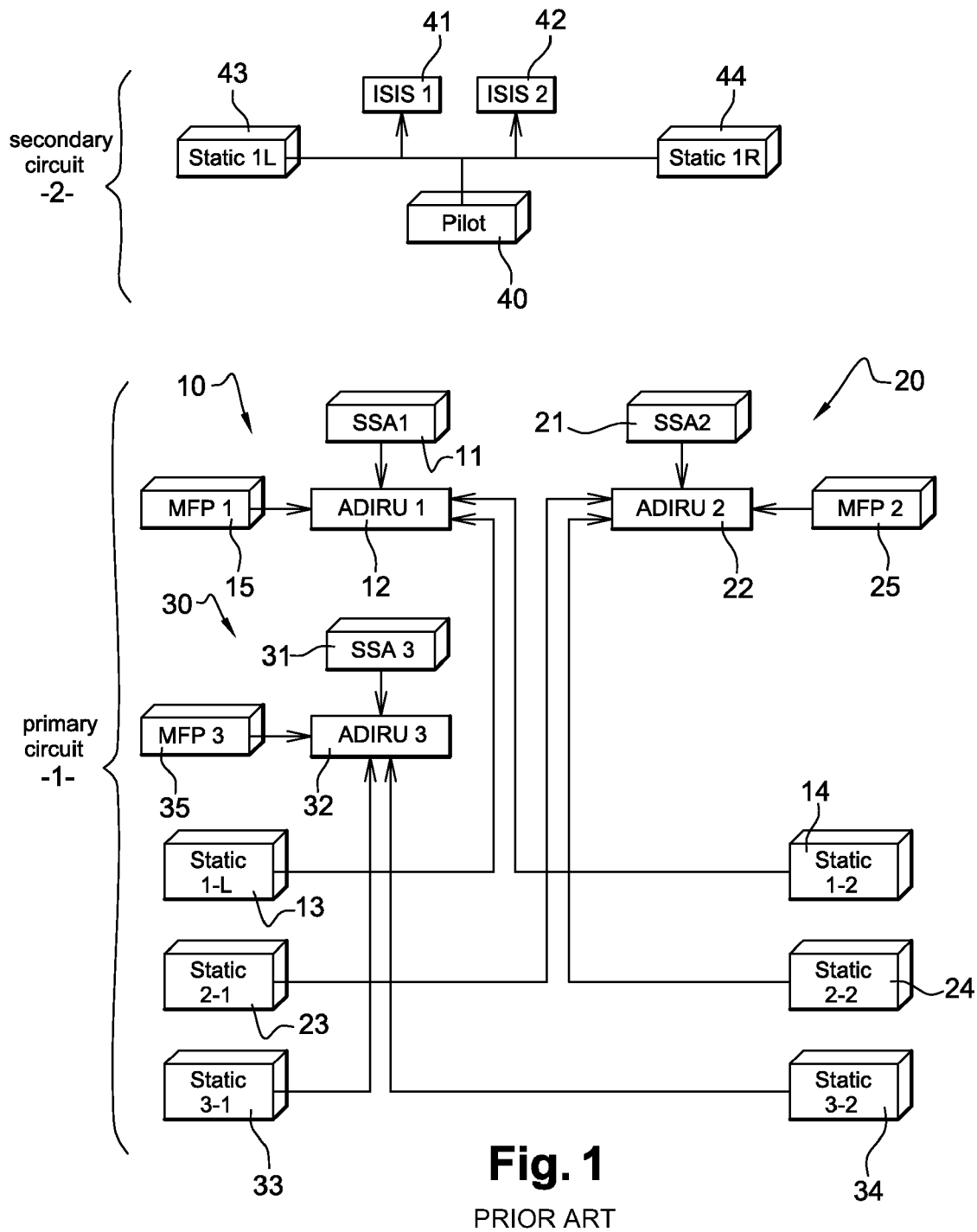
FIG. 1, already described, is a functional diagram of a classic system for the monitoring of anemobaroclinometric parameters.

The system of the disclosed embodiments for the monitoring of anemobaroclinometric parameters proposes the use, in addition to the classic measurement circuits or as a replacement of the circuit or of a classic measurement channel, of a laser type anemometer enabling optical measurement of certain anemobaroclinometric parameters. Indeed, a laser anemometer enables the measurement of certain anemobaroclinometric parameters, especially the speed of the aircraft in its three directions, hence its speed vector, thus enabling the angle of attack of the aircraft and the sideslip component of the aircraft to be found.

A laser anemometer proceeds by measurement of the shift undergone by a monochromatic light wave, especially a laser wave, when it is back-scattered by aerosols (particles and/or molecules) present in the atmosphere. This shift is used to determine the component of the speed vector along the line of sight. In other words, a laser anemometer emits laser radiation at a predetermined distance of some meters or some tens of meters beyond the aircraft and receives this laser radiation after back-scattering by the air. The component of the speed vector along the line of sight is directly related to the change in wavelength of the laser radiation.

In emitting three laser radiations along three different directions, the laser anemometer is capable of determining the three components of the speed vector of the aircraft. For reasons of security and availability, i.e. to make sure that the measurement performed by these three emissions is precise, a fourth emission of laser radiation can be made, along a fourth direction, making it possible to verify that it truly corresponds to the result obtained by the previous three emissions.

This measurement of the components of the speed vector gives the true airspeed (TAS) parameter of the aircraft. The true airspeed of the aircraft of the speed of the aircraft relative to undisturbed air. From this true airspeed, the laser anemometer can reduce the angle of attack (AOA) parameter of the aircraft and the side-slip angle SSA of the aircraft. In certain technologies, the laser anemometer can also provide a measurement of the following parameters:

total air temperature TAT, i.e. the total air temperature outside the aircraft, computed airspeed (CAS), i.e. the corrected airspeed of the aircraft, as well as the Mach number, i.e. the speed of the aircraft taking account of the variations in density of the air, which corresponds to the speed of aircraft relative to the speed of sound.

The laser anemometer can be placed in a housing made in the vicinity of the external skin of the aircraft and protected by a window ensuring optical passage of the laser rays. The laser anemometer can therefore be placed inside the fuselage, i.e. without giving rise to any protuberance on the external skin. It thus enables a measurement of parameters without generating drag or noise.

Furthermore, since the laser anemometer is housed in the fuselage of the aircraft, it is protected from the airflow and therefore insensitive to frost and rain.

A laser anemometer thus enables a measurement of parameters with an optical technology that is different from the mechanical technology of the probes of classic primary and secondary circuits. This measurement of parameters with optical technology provides an additional level of security to the currently used measurement of parameters. This additional level of security may be provided:

either by adding an additional measurement circuit comprising at least one anemometer, or by replacing the secondary circuit or a channel of the primary circuit by an anemometer.

Figure 2:
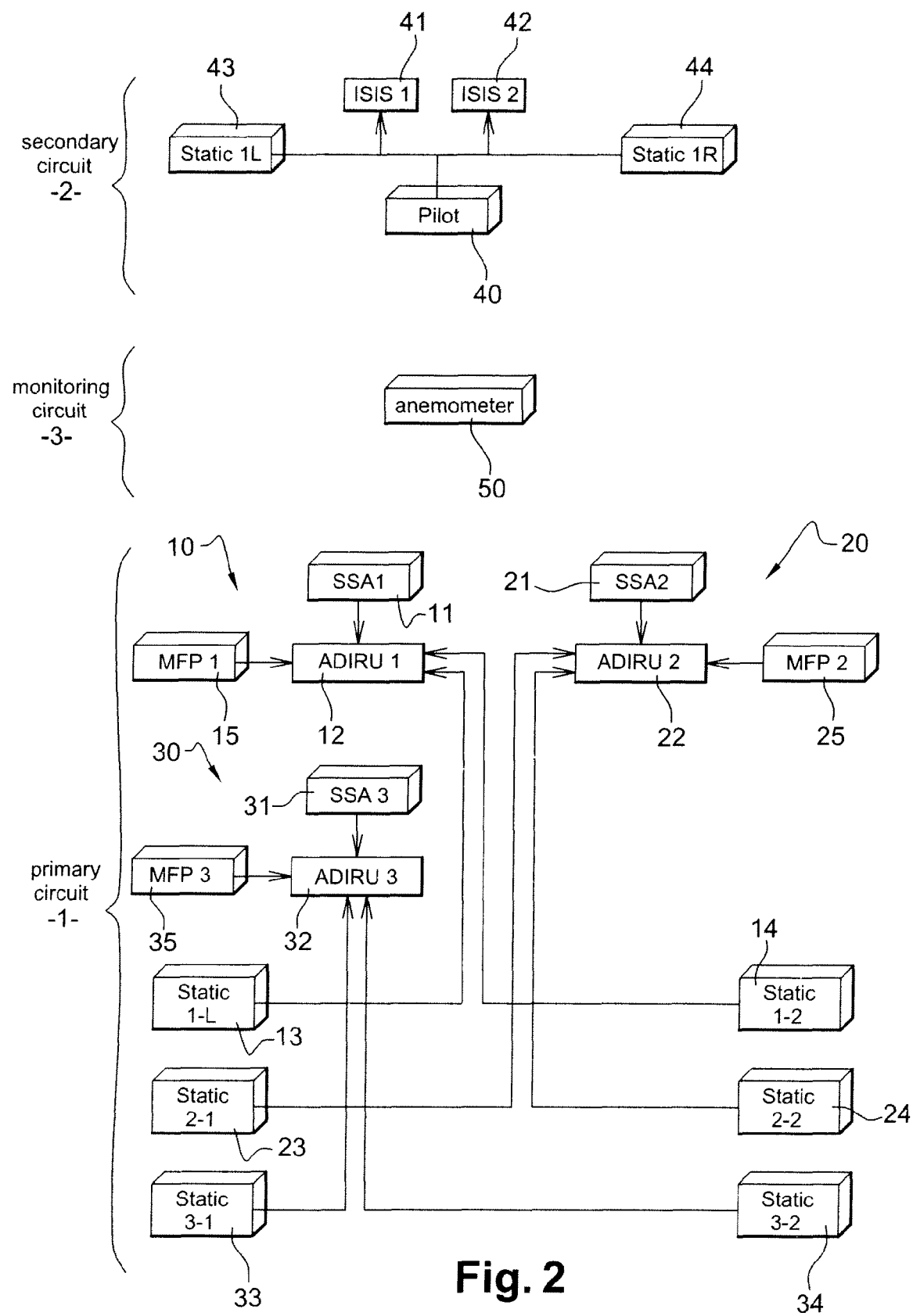
FIG. 2 is a functional diagram of the system for monitoring anemobaroclinometric parameters when the laser anemometer constitutes a third measurement circuit.

In a first embodiment shown in FIG. 2, the laser anemometer is integrated into an additional measurement circuit, providing for a measurement of anemobaroclinometric parameters that is complementary to the measurements made by the primary circuit and the secondary circuit. This additional measurement circuit is called a monitoring circuit 3. In this embodiment, the primary circuit 1 and secondary circuit 2 are identical to the classic primary and secondary circuits shown in FIG. 1. They are therefore not described again.

In the embodiment of FIG. 2, the monitoring circuit 3 comprises at least one anemometer 50 used to monitor the parameters measured by the primary circuit 1 or the secondary circuit 2 if there is a fault in the primary circuit 1. The measurements obtained by the anemometer 50 can then be compared with the measurements obtained by the primary circuit 1 in order to verify that all the parameters obtained are situated in the expected range of measurements. The anemometer 50 then provides additional security relative to the validity of the measurements.

Figure 3:
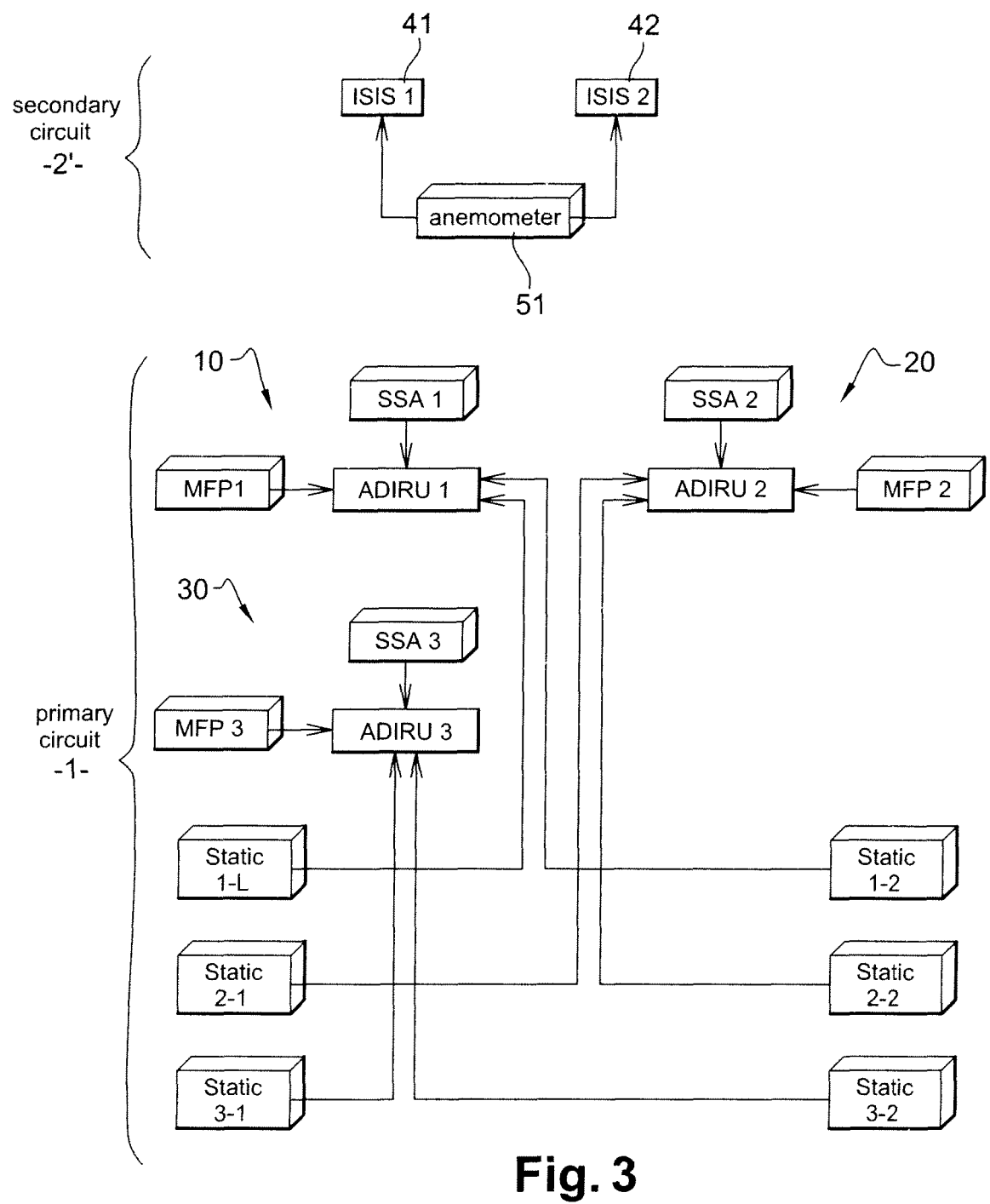
FIG. 3 is a functional diagram of the system for monitoring anemobaroclinometric parameters when the laser anemometer constitutes the secondary measurement circuit.

In a second embodiment shown in FIG. 3, the laser anemometer is integrated into the secondary circuit, replacing classic probes. In this embodiment, the primary circuit is identical to the classic primary circuit. It is therefore not described again.

In this second embodiment, the secondary circuit 2' comprises at least one anemometer 51 that measures anemobaroclinometric parameters, in replacing the static probes 43, 44 and the Pitot tube 40 of the classic secondary circuit. Depending on the anemometer chosen, it can be connected to the processing devices 41 and 42 described here above. These processing devices 41 and 42 process the data in order to deduce other anemobaroclinometric parameters therefrom; they also provide the link with the onboard computer of the aircraft. The anemometer can also be capable itself of determining the non-measured anemobaroclinometric parameters.

In this embodiment, the anemometer contributes to forming the standby circuit 2' used in the event of dysfunction in the primary circuit 1. In this embodiment, the standby circuit has the advantage of using a technique different from that of the primary circuit and is therefore usable with greater security if all three channels of the primary measurement circuit have a same functioning defect.

Figure 4:
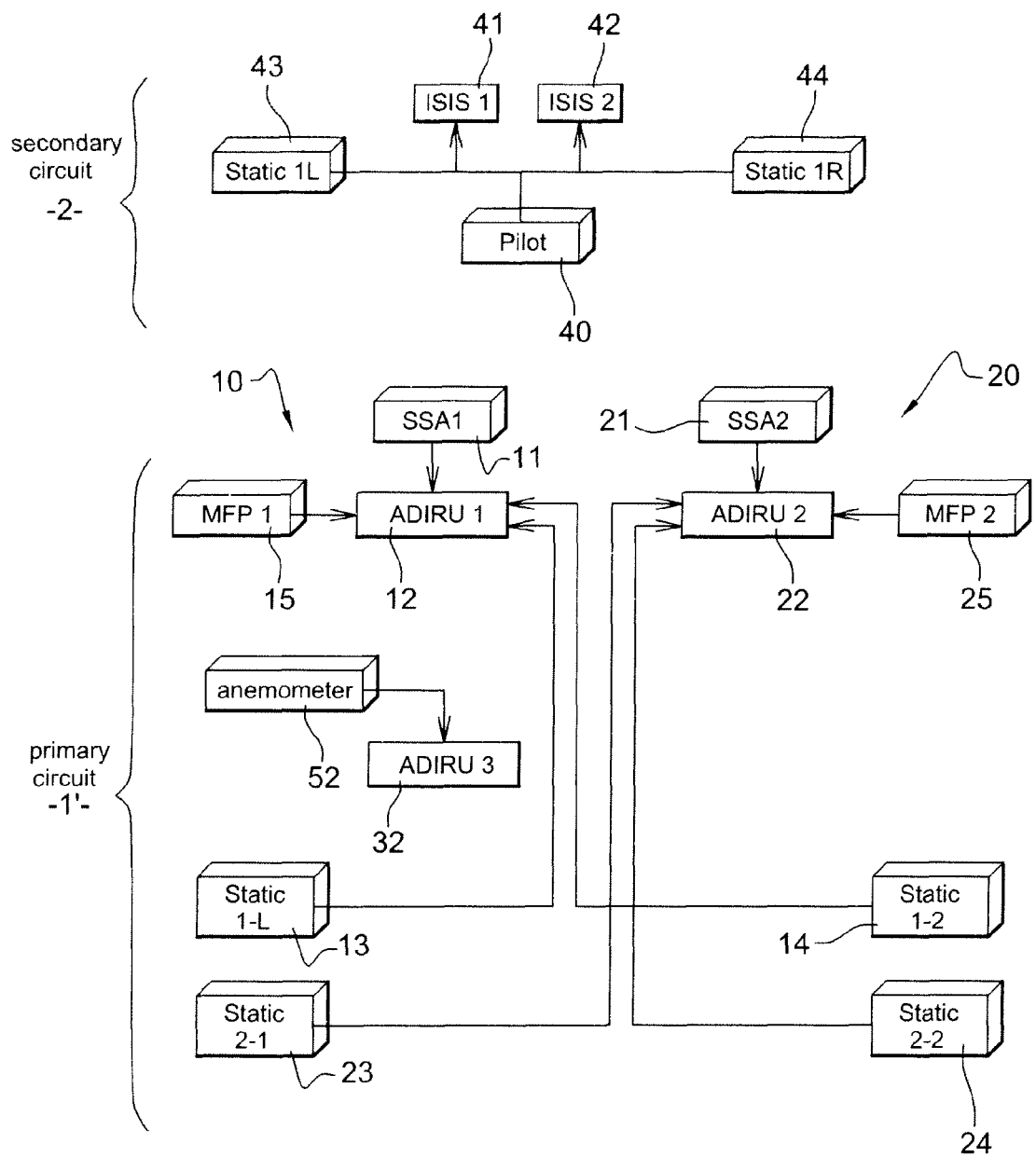
FIG. 4 is a functional diagram of the system for monitoring anemobaroclinometric parameters when the laser anemometer constitutes a measurement channel of the primary measurement circuit.

In a third embodiment of the invention, shown in FIG. 4, the laser anemometer is integrated into the primary circuit 1', replacing a measurement channel of the classic secondary circuit described here above. It is therefore not described again.

In this third embodiment, the anemometer 52 constitutes a measurement channel of the primary circuit 1'. The anemometer 52 is therefore integrated into the primary circuit 1', replacing the measurement channel 30. Depending on the anemometer chosen, it may be connected to the processing device 32 which determines the non-measured anemobaroclinometric parameters and the link with the onboard computer. The anemometer can also itself be capable of determining the non-measured anemobaroclinometric parameters.

In this embodiment, the anemometer 52 constitutes a redundancy of the measurement channels 10 and 20 of the primary circuit 1'. In this embodiment, the laser anemometer 52 increases the reliability of the system by the fact that it provides a redundancy obtained by a technology different from that of the other two measurement channels 10 and 20 of the primary circuit.

In one variant of the disclosed embodiments, a second laser anemometer can be implemented in one of the measurement channels 10 or 20 of the primary circuit 1'. The primary circuit then has a classic measurement channel comprising probes and two measurement channels compliant with the invention, each having a laser anemometer.

The integration of at least one laser anemometer into the primary circuit, the secondary circuit, or a monitoring circuit enables the measurement of the true airspeed of the aircraft and, from this true airspeed, makes it possible to find all the anemobaroclinometric parameters generally used on board an aircraft by means of a technology other than that of mechanics.

The invention claimed is:

1. A system for monitoring anemobaroclinometric parameters in an aircraft, comprising a primary detection circuit comprising at least one measurement channel, the measurement channel comprising:

a mechanical device for measuring static air pressure;

a mechanical device for measuring a side-slip angle of the aircraft, a mechanical device for measuring a dynamic pressure, a total air temperature and a angle of attack of the aircraft, and a data-processing device configured to determine anemobaroclinometric parameters from the measurements of static pressure, side-slip angle, dynamic pressure, total air temperature and angle of attack, wherein the system further comprises a least one laser anemometer to measure at least one true airspeed parameter of the aircraft, and to provide a redundant indication of at least one of static pressure, side-slip angle, dynamic pressure, total air temperature and angle of attack during flight using a non-mechanical technology, the laser anemometer being placed in a housing made in the vicinity of the external skin of the aircraft and being protected by a window ensuring the optical passage of the laser rays.

2. The system according to claim 1, wherein the laser anemometer is integrated into a secondary detection circuit.

3. The system according to claim 1, further comprising:

a secondary detection circuit comprising at least one static pressure measurement device, at least one dynamic pressure measurement device, at least one processing device for processing the data supplied by the measurement devices, and wherein the laser anemometer further comprises a circuit for monitoring the parameters.

4. The system according to claim 1, wherein the laser anemometer is integrated into a second measurement channel of the primary detection circuit.

5. The system according to claim 4, wherein the primary detection circuit comprises a third measurement channel similar to the first measurement channel.

6. The system according to claim 4, wherein the primary detection circuit has a third measurement channel integrating a second laser anemometer.

* * * * *